H. DILLAWAY.

Re. 308

GLASS MOLD.

No. 2,226.

Patented Aug. 21, 1841.

Fig. 1.

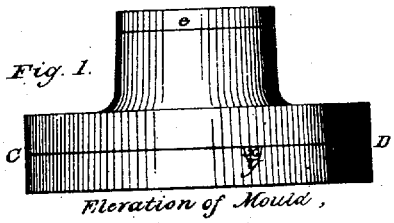

Eleration of Mould, shewing top of plunger.

Fig. 2.

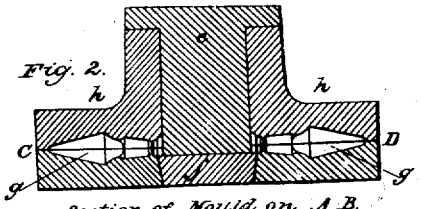

Section of Mould on A.B. shewing plunger and moveable bottom piece.

Fig. 3.

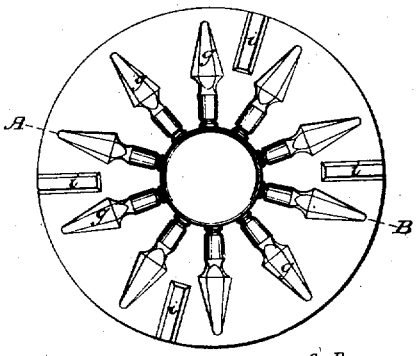

Horizontal Section on C,D. shewing underside view of top part of Mould.

Fig. 4.

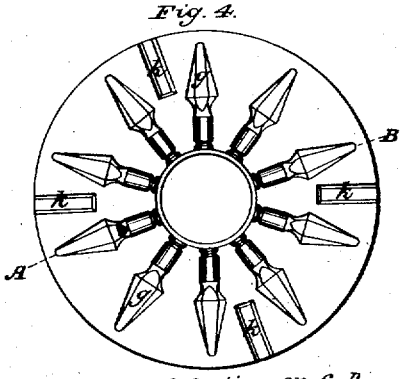

Horizontal Section on C,D. shewing top view of lower part of Mould.

Fig. 5.

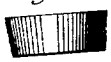

Moveable bottom piece.

Fig. 6.

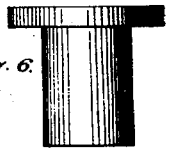

Plunger.

Fig. 7.

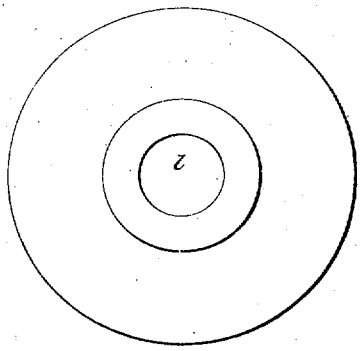

Top view of Mould without the plunger.

Fig. 8.

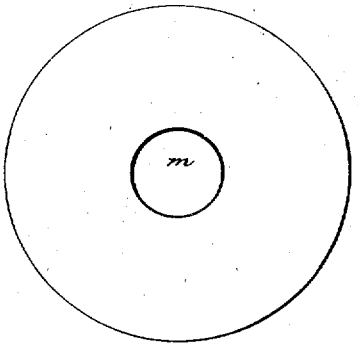

Underside view of Mould, without the moveable bottom piece.

UNITED STATES PATENT OFFICE.

HIRAM DILLAWAY, OF SANDWICH, MASSACHUSETTS.

IMPROVEMENT IN THE CONSTRUCTION OF MOLDS FOR PRESSING GLASS.

Specification forming part of Letters Patent No. 2,226, dated August 21, 1841; Reissue No. 308, dated May 1, 1855.

*To all whom it may concern:*

Be it known that I, HIRAM DILLAWAY, late of Boston, in the county of Suffolk, but now of Sandwich, in the county of Barnstable, and Commonwealth of Massachusetts, have invented a new and useful Improvement in Molds for the Manufacture of Articles of Glassware; and I do hereby declare that the following is a full and exact description of the same.

My said invention is to be found in such a formation of the mold as shall cause the forms—by which I mean the cavities—into which the articles are to be pressed or molded to be filled with the melted glass to great advantage by means of a pressure applied to a mass of that material in a larger fountain connected with the forms, and it may be applied either to pressing a single article or a number of articles at one operation.

I will describe that mold which I have found convenient for pressing a number of small articles at once, but the relative positions of the forms may be varied according to circumstances in molding different articles so long as they are arranged so as to lead out of the lower part of the fountain. A block, of a circular or other convenient form, proportioned to the size of the article and number of them to be formed at once, is made with a central elevation or neck on the top, in diameter equal to about one-half, and in height equal to about the whole, of that of the body of the block. The block is divided horizontally through the middle so as to make an upper and lower section, which constitute the two parts of an open and shut mold. Through the center of this elevation or neck the upper section is bored vertically so as to have a cylindrical hollow, of a diameter about half of that of the neck, passing entirely through it. The lower section is also bored vertically through the center, but so as to have a bore of a diameter a little larger than that of the bore of the upper section. The lower edge of the bore of the upper section is then hollowed or grooved out so as to make it meet and match that of the lower section when the two parts are put together. All that part of the cylindrical hollow thus made through the entire block, which is not occupied by the bottom piece hereinafter described, I call the "fountain." The forms of the articles to be pressed are made by cavities on the inner surfaces of the upper and lower sections of the block cut to the shape designed, those in the upper matching with those in the lower section, and so disposed as to communicate with the central cylindrical hollow, and, when it is desirable to cast more than one article by one operation, the forms or cavities may be made to radiate or diverge from the central bore toward the outer circle of the block, as in the mold I am now describing. It may be found convenient to have in that part of the forms next to the central bore a small elevation, *n n*, (see the drawings hereinafter referred to,) with a sharpened edge sufficient to form a slight indentation around the end of the article pressed. These forms may be as numerous as the size of the article to be made and of the block containing them will admit, those in the mold exhibited in the drawings being for making glass stoppers for bottles. To the bore of the lower section is fitted a bottom piece, *f*, reaching as high as the lower edge of the forms and entirely filling the bore to that point, this bottom piece to be made movable. A plunger is fitted to the hollow in the neck of the upper section so as to pass down the bore to the bottom piece. When the plunger is brought down entirely home to the bottom piece, the diameter of the bore of the lower section being larger than that of the bore of the upper, and consequently than that of the plunger which is fitted to it, and the lower edge of this upper bore being hollowed out to meet the upper edge of the lower one, as above described, there is left around the bottom of the plunger a vacant chamber, *h h*, into which all the forms open, so that the plunger, however far pressed down, cannot close or obstruct the mouths of the forms. It may be found convenient to have, as in the mold I am now describing, on the inner surface of the upper section, at convenient points near its circumference, elongated square elevations, and on that of the lower one corresponding depressions, matching the one into the other, for the purpose of keeping each part of the mold secure in its proper place. The block may be made of cast-iron, or other metal sufficiently firm for the purpose and capable of bearing heat, and the central hollow and plunger may be made square, instead of cylindrical, when a number of articles are to be made at once, of such a shape as to make that form most convenient.

For the better specification of my said improvement I refer to the accompanying drawings, as follows:

Figure 1 is the block, showing the horizontal division C D, and the top of the plunger *e* dropped entirely down to reach the bottom piece. Fig. 2 is a vertical section of the block A B, showing the plunger *e* and movable bottom piece, *f*, and a sectional division of the forms or matrices *g*, and of the hollowing out of the lower edge of the bore in the upper section to meet the larger diameter of the bore in the lower section, the whole being to form the lower or auxiliary chamber, *h*. Figs. 3 and 4 are horizontal sections of the mold on C D, showing plan of the forms or matrices *g* in the inner surfaces of the upper and lower sections of the mold; also, the elevations *i* and depressions *k*. Fig. 5 is a movable bottom piece. Fig. 6 is a plunger. Fig. 7 is a top view of the mold without the plunger, showing the aperture *l*, into which the plunger passes. Fig. 8 is an under-side view of the mold without the movable bottom piece, and showing the aperture into which it is placed.

The mode of using my said mold is described as follows: The mold being properly heated, a quantity of metal sufficient to fill all the forms or matrices, and a portion of the central hollow or fountain besides, is gathered and dropped in at the neck of the upper section. The plunger is then brought down upon it with a pressure sufficient to force the metal out laterally from the central hollow into all the forms or matrices communicating with it. Should the quantity gathered and dropped in at any time be so little more than enough to fill the forms as to allow the plunger to be forced down below their upper edges, the metal not required to fill the forms remaining in and filling the chamber above described will be sufficient to prevent any imperfection in the pressing. After the metal is partially cooled the upper section is removed, and the pressed glass taken from the lower one, and the articles broken from the central mass at the indentations made by the edged elevation before referred to. The object of making the bottom piece movable is that if the glass hangs or adheres to the lower section the bottom piece may be moved by force or pressure applied from below, and sufficient to start from the mold the glass with the articles attached, such being sometimes found necessary.

Any number of articles, according to their size and that of the block containing the forms, may be pressed at one time from one central fountain and by one plunger. The size, weight, and thickness of the articles made at each successive use of the same mold will be the same, the difference between the quantity of metal supplied at one time and another being left in the central mass instead of being forced into the article formed.

I claim—

1. So combining with a mold fountain or reservoir provided with a plunger, one or more matrices or molds that a liquid mass of glass, when pressed in said fountain or reservoir by the plunger, may be made to flow or pass therefrom and into such matrix or matrices.

2. Combining with a series of matrices and a press chamber or reservoir surrounded by them an auxiliary annular and concentric chamber, as seen at *h h*, in Fig. 2, formed in the two mold-plates and made to perform the function of preventing the plunger from clogging the mouths of the matrices under circumstances as above stated, and also to prevent the chilled glass from obstructing the downward movement of the plunger.

3. So combining with the lower mold-plate a movable bottom block, *f*, that the same may not only serve to form a bottom to the main and auxiliary mold-chambers, or to the former, but also enable a person to detach the pressed glass or metal from the lower mold-plate under circumstances and in manner as above set forth.

In testimony whereof I have hereunto set my signature this 16th day of March, A. D. 1855.

HIRAM DILLAWAY.

Witnesses:
R. H. EDDY,
F. P. HALE, Jr.